United States Patent
Duett et al.

[11] Patent Number: 5,730,541
[45] Date of Patent: Mar. 24, 1998

[54] TURNBUCKLE DRIVER

[76] Inventors: Neal K. Duett, 14820 154th Pl. SE.; Daniel W. Curtis, 18312-151st Ct SE., both of Renton, Wash. 98058

[21] Appl. No.: 641,113

[22] Filed: Apr. 29, 1996

[51] Int. Cl.⁶ .................................................. F16B 7/06
[52] U.S. Cl. .......................... 403/45; 403/44; 403/43; 81/57.29; 81/57.13
[58] Field of Search ............... 403/43–48, 19, 403/33, 24; 81/57.29, 57.28, 57.12, 57.13, 119, 121.1

[56] References Cited

U.S. PATENT DOCUMENTS

| | | |
|---|---|---|
| 1,121,327 | 12/1914 | Curran . |
| 1,157,110 | 10/1915 | Johnson ............................ 403/45 X |
| 1,383,274 | 7/1921 | Abernathy ............................ 81/119 |
| 1,487,648 | 3/1924 | Folsom ............................ 403/44 X |
| 1,544,847 | 7/1925 | Mason ............................ 81/57.13 |
| 3,585,884 | 6/1971 | Leckie et al. . |
| 3,709,072 | 1/1973 | Rogers . |
| 3,803,926 | 4/1974 | Winter . |
| 4,130,269 | 12/1978 | Schreyer ............................ 403/45 X |
| 4,186,615 | 2/1980 | Adams . |
| 4,487,094 | 12/1984 | Wilkens et al. . |
| 4,528,873 | 7/1985 | Lee ............................ 81/57.29 |
| 4,537,388 | 8/1985 | McCabe ............................ 403/43 X |
| 4,830,339 | 5/1989 | McGee et al. ............................ 403/44 X |
| 4,973,185 | 11/1990 | Thaller ............................ 403/43 X |
| 5,392,671 | 2/1995 | Hazzard . |
| 5,466,083 | 11/1995 | Hogg ............................ 403/43 X |

*Primary Examiner*—Harry C. Kim
*Attorney, Agent, or Firm*—Christensen O'Connor Johnson & Kindness PLLC

[57] ABSTRACT

A main mount (52) having a central hub (58) is secured to a turnbuckle. A ring gear (66) surrounds the hub. A motionless bearing (70) fits over the hub and is held in place with a locking ring (82). The motionless bearing (70) includes several bores that receive a driving bit (90) that engages the ring gear. As the driving bit is rotated, the main mount is rotated about the motionless bearing thereby tightening or loosening the turnbuckle.

6 Claims, 2 Drawing Sheets

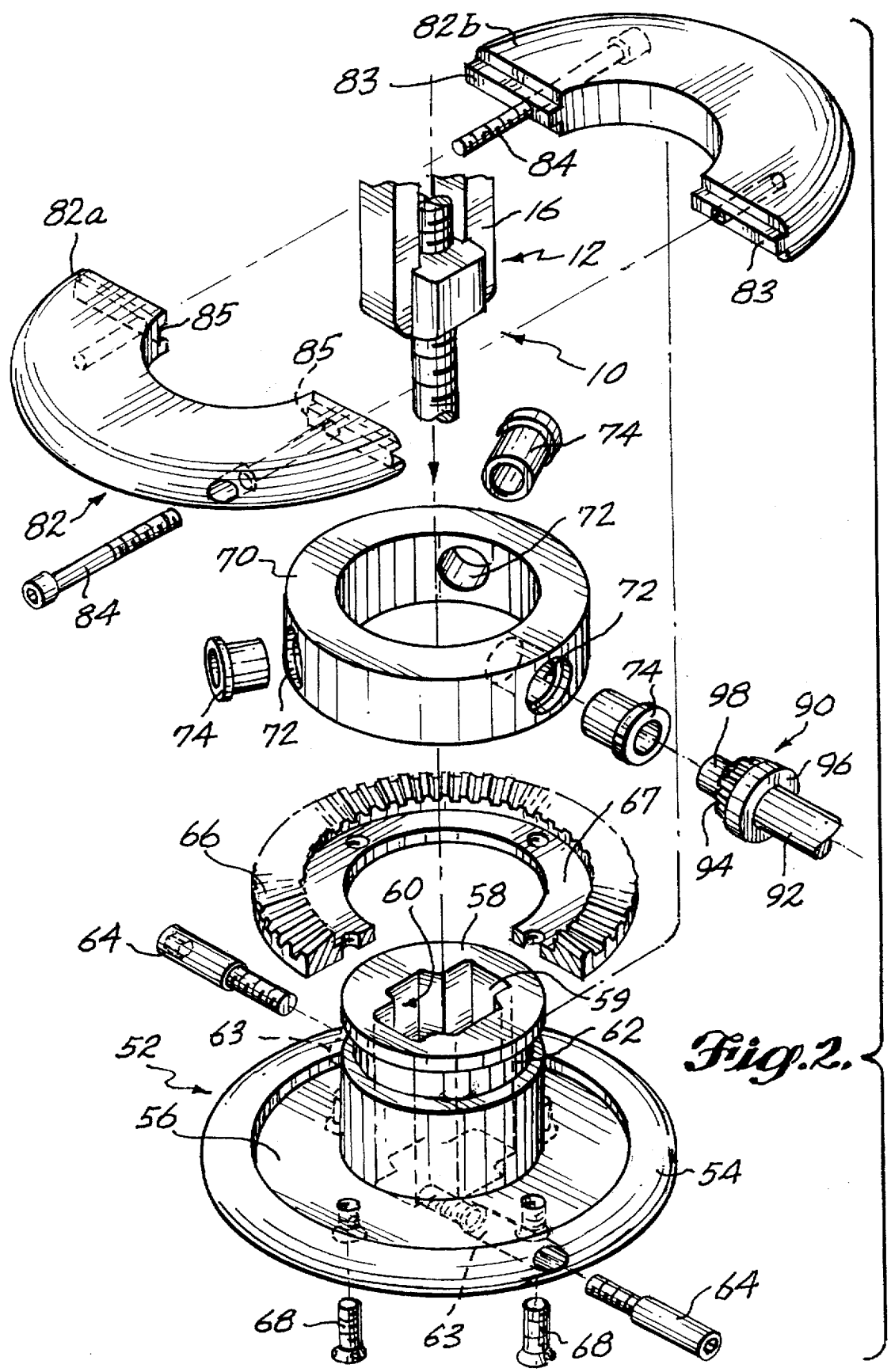

TURNBUCKLE DRIVER

FIELD OF THE INVENTION

The present invention relates to turnbuckles in general, and in particular to an apparatus for tightening or loosening a turnbuckle.

BACKGROUND OF THE INVENTION

A turnbuckle is a conventional mechanism that is used to tighten a linkage disposed between two or more objects. Turnbuckles are often found on barges, railroad cars, semi-trailers, or other means of transportation to prevent cargo from shifting.

A typical turnbuckle comprises a pair of axially aligned, oppositely threaded rods or spindles that are threaded into a rectangular frame. The frame is disposed in line with the linkage so that by rotating the frame with respect to the threaded spindles, the spindles are drawn into the frame, thereby tightening the linkage.

Traditionally, the turnbuckle is tightened by hand and/or by inserting a bar between a pair of spaced apart arms that comprise the frame and manually rotating the frame about the longitudinal axis of the spindles. This method is both tedious and time-consuming. In addition, the force of the bar on the frame can damage it over time. To improve upon the method of manually tightening a turnbuckle, numerous motorized devices have been proposed, such as those shown in U.S. Pat. Nos. 3,585,844; 3,803,926; and 4,487,094. However, such devices have not achieved widespread acceptance because they either require a dedicated motor, are overly cumbersome, or are too expensive to manufacture. Also, access to the turnbuckles can be limited and they may be located close together or close to other fixed objects. Therefore, there is a need for a simple mechanical device that can be used to tighten or loosen a turnbuckle, particularly in close quarters.

SUMMARY OF THE INVENTION

The present invention comprises an apparatus for tightening or untightening a turnbuckle with a rotary actuator. The apparatus includes a disc-shaped main mount having a hub that is slid over and secured to the turnbuckle. A ting gear is disposed about the hub. A motionless bearing having a diameter that is smaller than the inner diameter of the ring gear is also positioned over the hub. A locking ring secures the motionless bearing to the hub.

The motionless bearing includes one or more radial bores into which a driving bit can be fitted. The driving bit has a bevel pinion gear that mates with the ring gear so that as the driving bit is rotated, the main mount moves around the motionless bearing thereby tightening or untightening the turnbuckle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is an isometric view of the turnbuckle driver according to the present invention with the parts shown in exploded relationship.

DETAILED DESCRIPTION OF THE PREFERRED EMBODIMENT

Figure 1:
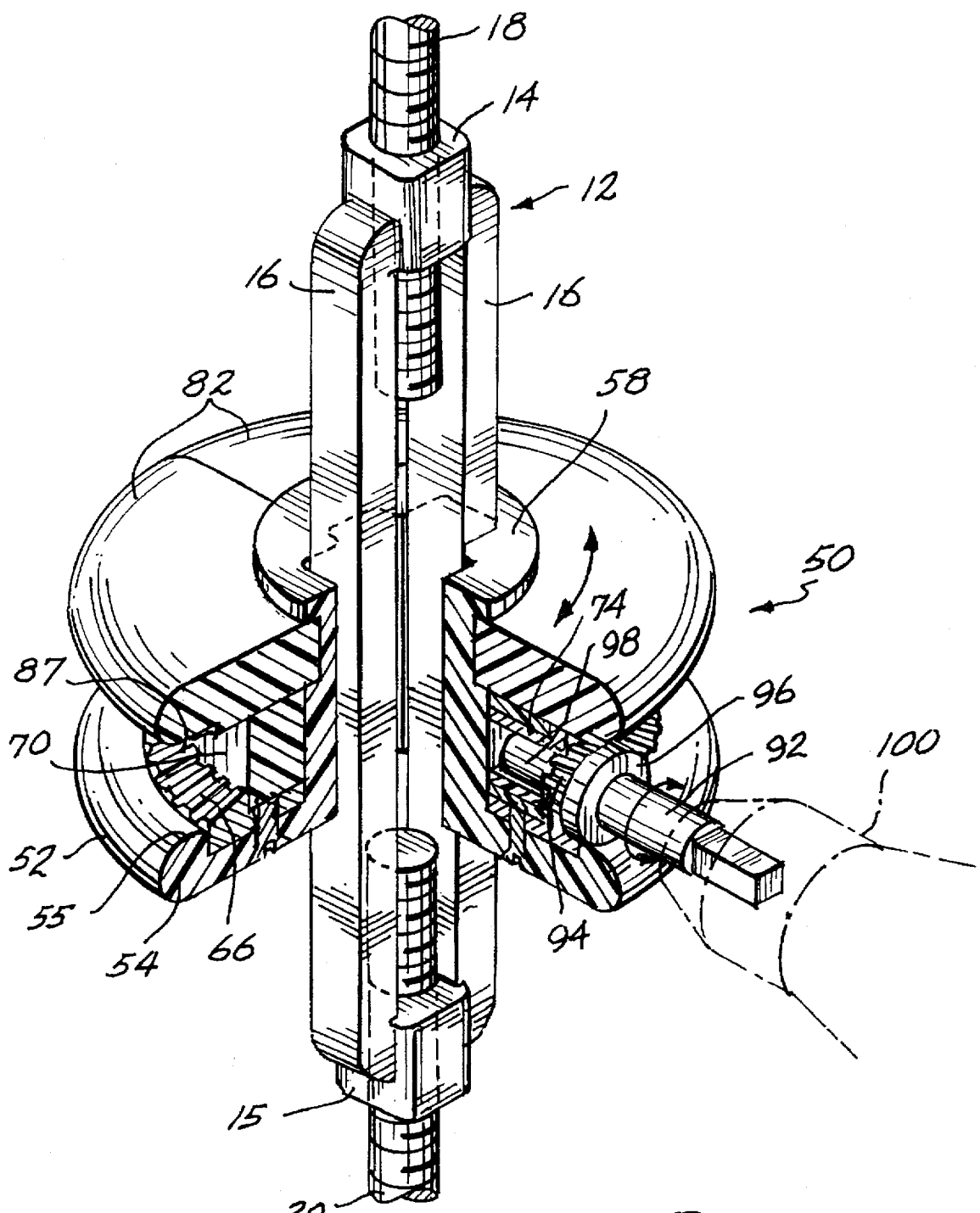
FIG. 1 is an isometric view of the turnbuckle driver according to the present invention with the parts shown in partial section.

The present invention is a turnbuckle driver for tightening and loosening a turnbuckle with a removable rotary actuator.

Turning now FIG. 1, the turnbuckle driver of the present invention is designed to be secured to a conventional turnbuckle 10 of the type that includes a central frame 12 having a first end block 14 and a second end block 15 that are spaced-apart by a pair of longitudinally extending parallel side plates 16. Each of the end blocks 14 and 15 is threaded to receive a corresponding threaded rod or spindle 18 and 20. The spindles are threaded in opposite directions so that if they are prevented from rotating, they will both be drawn into or out of the center of the frame 12 as the frame is turned.

The turnbuckle driver 50 of the present invention includes a main mount 52 having a central hub 58 that is slid over and secured to the parallel sides plates 16 of the frame 12. A ring gear 66 is secured to the main mount 52 at a position encircling the base of the hub 58.

As is best shown in FIG. 2, a motionless bearing 70 is fitted over the hub 58 so that the bearing is free to rotate relative to the hub. A split locking ring 82 is secured to the hub at a position over the motionless beating 70 to prevent the motionless beating from sliding off the hub.

As will be described in further detail below, the motionless bearing includes one or more bores into which the nose 98 of driver bit 90 can be fitted. The driver bit includes a bevel gear 94 to mate with the ring gear 66. When the driver bit is rotated, the main mount rotates with respect to the motionless bearing, thereby rotating the main mount and causing the frame 12 of the turnbuckle to draw in (tighten) or spread out (loosen)the threaded spindles 18, 20.

FIG. 2 shows the pans that comprise the turnbuckle driver 50 according to the present invention in greater detail. The main mount 52 has a flange 54 that extends radially outward from the base of the hub 58. The flange 54 includes an annular depression 56 surrounding the hub base. Depression 56 is sized to receive the ring gear 66. The ring gear is mounted to the flange 54 with screws 68 or other fastener mechanism.

A central channel 60 extends axially through the hub 58. The channel is shaped to fit closely over the frame 12 of the turnbuckle 10, including rectangular slots 59 for the side plates 16 and a central portion sized to receive an end block 14 or 15 as the hub is inserted. A pair of threaded holes 63 is drilled horizontally through the flange 54 to the slots 59 of the channel 60. The holes 63 are parallel and offset oppositely from a parallel diameter of the flange. A pair of set screws 64 can be screwed into the holes and tightened to clamp the turnbuckle side plates 16 and secure the main mount 52.

The teeth of the ring gear 66 are set back from the inner diameter of the gear to form a smooth inner depression 67 in which the motionless beating 70 is seated. A number of equally spaced radially extending bores 72 are disposed about the outer periphery of the motionless bearing. Each bore 72 is fitted with an appropriately sized bushing 74 to receive the nose 98 of the driving bit 90.

To prevent the motionless bearing 70 from sliding off the hub 58, the split locking ring 82 is secured near the top of the hub. The locking ring 82 is formed of two semi-circular sections 82a and 82b. Section 82b has horizontal tongues 83 that mate with corresponding grooves 85 on the other half of the locking ring. The locking ring has a thickness that is slightly less than the width of a peripheral groove 62 on the hub. The two halves of the locking ring are fitted into the groove and held together with a pair of bolts 84 or other suitable fastening. The motionless bearing thus is fitted between the bevel gear and the locking ring but is free to turn relative to both of them. In addition, the central hole of the split locking ting is sized to permit the ring to turn relative to the hub of the main mount.

The driving bit 90 comprises a shaft 92, a thrust beating 96, bevel gear 94 and the projecting nose 98. The bevel gear is set back from the forward end of the shaft to form the nose that can be inserted into one of the bushings 74 of the motionless bearing 70. The thrust bearing is positioned directly behind the bevel gear 94 and positions the bevel gear to mesh with the ring gear.

More specifically, as can be seen in FIG. 1, with the nose 98 of the driving bit inserted into a bushing 74 of the motionless bearing 70, the bevel gear 94 mates with the ring gear 66. When the driving bit is turned with a rotary actuator 100 such as an electric, pneumatic or hydraulic drill, the main mount 52 is driven around the motionless bearing 70. The thrust bearing 96 rotates in a race formed by an inside surface 87 at the bottom margin of the locking ring 82 and an inside surface 55 at the top margin of the flange 54. The larger diameter bearing ensures reliable engagement of the driving bevel gear with the driven ring gear, without engagement of the bevel gear with the locking ring. Actually, some useless rotary motion may be imparted to the locking ring by the thrust bearing, but in the opposite direction as compared to the direction that the main mount is driven. For example, if the mount is driven clockwise, the locking ring tends to rotate counter-clockwise by turning of the bearing 96.

As will be appreciated, by inserting the driving bit into any one of the bushings in the motionless bearing and rotating the driving bit, the bevel gear causes the main mount to move with respect to the motionless bearing, thereby tightening or loosening the turnbuckle.

The turnbuckle driver of the present invention remains secured to the turnbuckle after the turnbuckle has been tightened or loosened. However, the driving bit and rotary actuator 100 are removed. Because the driver bit can be removed from the turnbuckle driver, only one rotary actuator is required to adjust the tension of several turnbuckles. Also, access is required only from one narrow side of the turnbuckle, and bit extensions can be used if necessary, making the present invention particularly useful if access is limited.

In the presently preferred embodiment of the invention, the main mount, motionless bearing and locking ting are made of a durable plastic such as polyurethane. However, if greater durability is desired, these parts could also be made from a suitable metal such as stainless steel.

While the preferred embodiment of the invention has been illustrated and described, it will be appreciated that various changes can be made therein without departing from the spirit and scope of the invention. It is therefore intended that the scope of the invention be determined from the following claims.

The embodiments of the invention in which an exclusive property or privilege is claimed are defined as follows:

1. An apparatus for tightening/loosening a turnbuckle that includes a pair of oppositely threaded spindles and a frame into which the spindles are threadably inserted, comprising:

a mount that can be secured to the frame of the turnbuckle and having a hub;

a motionless beating disposed around the hub and free to rotate about the mount;

a ring gear on the mount and disposed around the hub for encircling the frame of the turnbuckle, the ring gear having gear teeth that extend circumferentially around the hub; and a driving bit having a bevel pinion gear that mates with the ting gear, the driving bit being adapted to be inserted into a part of the motionless bearing so that as the driving bit is rotated, the mount is driven around the motionless bearing.

2. The apparatus of claim 1, further including a locking ting secured to the hub that prevents the motionless beating from coming off the hub.

3. The apparatus of claim 1, further comprising a rotary actuator for rotating the driving bit.

4. A tightening/loosening apparatus comprising:

a turnbuckle having a pair of oppositely threaded spindles and a frame into which the spindles are threadably inserted;

a mount secured nonrotatably to the turnbuckle frame;

a drive gear on the mount, whereby rotative motion imparted to the drive gear will be imparted to the mount and the frame; and a motionless bearing fitted on the mount, the mount and bearing being adapted to receive a rotary driving member from a generally radial direction for transfer of rotative motion to the drive gear.

5. The apparatus defined in claim 4, wherein the mount includes a hub, the drive gear being a ring gear that extends circumferentially around the hub, the motionless bearing being disposed around the hub.

6. The apparatus of claim 4, in which the motionless bearing has at least one generally radially extending hole for receiving a nose portion of a rotary driving member to position the rotary driving member relative to the drive gear.

* * * * *

UNITED STATES PATENT AND TRADEMARK OFFICE
CERTIFICATE OF CORRECTION

PATENT NO. : 5,730,541
DATED : March 24, 1998
INVENTOR(S) : N.K. Duett et al.

It is certified that error appears in the above-identified patent and that said Letters Patent is hereby corrected as shown below:

| COLUMN | LINE | |
|---|---|---|
| 4 (Claim 1, | 15 line 6) | "beating" should read --bearing-- |
| 4 (Claim 1, | 22 line 13) | "ting" should read --ring-- |
| 4 (Claim 2, | 27 line 2) | "ting" should read --ring-- |
| 4 (Claim 2, | 27 line 2) | "beating" should read --bearing-- |

Signed and Sealed this

Ninth Day of June, 1998

Attest:

BRUCE LEHMAN

*Attesting Officer*           *Commissioner of Patents and Trademarks*